United States Patent [19]

Stimler

[11] Patent Number: 4,970,705

[45] Date of Patent: Nov. 13, 1990

[54] CONSTANT FOCAL LENGTH ACOUSTIC LENS

[75] Inventor: Morton Stimler, Rockville, Md.

[73] Assignee: The United States of America as represented by the Secretary of the Navy, Washington, D.C.

[21] Appl. No.: 334,672

[22] Filed: Dec. 3, 1981

[51] Int. Cl.[5] .............................................. G01S 15/00

[52] U.S. Cl. .................................... 367/150; 367/902; 181/176

[58] Field of Search ........................ 367/150, 902, 171; 310/335; 181/176

[56] References Cited

U.S. PATENT DOCUMENTS 3,620,326 11/1971 Hogge ................................ 181/176
3,776,361 12/1973 Rolle .................................. 181/176
3,818,425 6/1974 Peynaud et al. ................ 367/902 X

OTHER PUBLICATIONS

Stimler, *IEEE J. Oceanic Eng.*, vol. OE-3, No. 2, Apr. 1978, pp. 45–47.

Stimler, *IEEE Inter. Con. on Acoustics, Speech and Signal Processing*, 1977, pp. 120–123.

*Primary Examiner*—Thomas H. Tarcza
*Assistant Examiner*—Daniel T. Piholic
*Attorney, Agent, or Firm*—Kenneth E. Walden

[57] ABSTRACT

A temperature compensation system that adjusts the temperature of an acoustic lens fluid in a prescribed manner to maintain the index of refraction of the fluid constant relative to the surrounding water thereby maintaining the focal length of the lens constant over its operating temperature range. The system comprises two temperature sensors, a programmed lens fluid temperature prescriber and an error amplifier all cooperating to direct a servomechanism system to adjust a temperature control system to either heat or cool the lens fluid to the prescribed temperature so that its index or refraction and focal length are held constant.

10 Claims, 3 Drawing Sheets

CONSTANT FOCAL LENGTH ACOUSTIC LENS

BACKGROUND OF THE INVENTION

This invention relates to the field of liquid filled acoustic lenses and more particularly to a temperature compensated liquid filled acoustic lens. Although not limited thereto, the invention is an improvement to and is disclosed herein in use with the conical liquid filled acoustic lens described in the articles "Opto-Acoustic Feasibility Design of a Conical Acoustic Lens" by Morton Stimler, IEEE Journal of Oceanic Engineering, Vol. OE-3, No. 2, April, 1978, and "Theory and Technical Approach in the Feasibility Design of a Conical Acoustic Lens", by Morton Stimler, 1977 IEEE International Conference on Acoustics Speech and Signal Processing Record. That lens, to be described further for a complete understanding of the subject invention, demonstrated the temperature dependent nature of liquid filled acoustic lenses for proper focusing which the present invention overcomes.

Liquid filled acoustic lenses are used to detect and localize underwater sound waves and their sources such as submarines or torpedoes. They operate on the principle of the refraction of sound waves when passing from one medium to another to focus the sound waves upon suitable transducers.

In order for an acoustic lens to be practical, its focal length must remain nearly constant over its entire expected operating temperature range. This requires that the acoustic index of fraction of the lens fluid, relative to the ambient medium, remain constant over that operating range. In the past, this has been attempted by maintaining the lens fluid temperature constant as the ambient water temperature changed, however merely maintaining the temperature of the lens fluid constant as the temperature of the ambient medium changes does not maintain a constant index of refraction. This is so because the index of refraction of the lens fluid relative to the ambient medium is dependent upon the ratio of the velocity of sound in the ambient medium to the velocity of sound in the lens fluid, which velocities change at different rates and in different magnitudes with temperature. It can be seen that the ratio of these sound velocities and therefore the index of refraction relative to the ambient water will change even though the temperature of the lens fluid is held constant, which results in a change in the focal length of the lens.

Ships utilizing these lenses are subject to temperature changes as they move through the water between a variety of geographical locations, and the depth of the lens below the surface of the water significantly effects a temperature change. It can be appreciated that these temperature changes will therefore result in loss of proper detection and localization of the subject underwater source, and it is therefore highly desirable to have a lens that maintains its focusing properties independent of temperature. Athermal lenses have been devised, but each have limitations. These limitations include restrictions on the type of lens fluids that may be used, operating temperature limits that restrict the ability of the lens to be used in all temperature environments that might be encountered, and predetermination of the temperature to be encountered, which can not always be done. Some methods of compensating for the temperature dependence of the focal length include mounting the hydrophone transducers so as to permit them to be moved to the focal point with temperature changes.

These lenses are complex, expensive and time consuming to operate.

SUMMARY OF THE INVENTION

It is an object of this invention to provide for an improved liquid filled acoustic lens.

Another object of the invention is to provide for a liquid filled acoustic lens that maintains its sound focusing ability with changes in ambient temperature.

Another object of the invention is to provide for a system that automatically maintains the focal length of a liquid filled acoustic lens over its operating temperature range.

Other objects and many attendant advantage will be readily appreciated as the subject invention becomes better understood by reference to the detailed description when considered in conjunction with the accompanying drawings.

The invention overcomes the shortcoming of the prior art and achieves the objects by providing an automatic temperature compensation system that adjusts the temperature of the lens fluid to maintain the fluid's index of refraction relative to the ambient sea water constant and therefore the focal length of the lens constant. The temperature compensation system includes two temperature sensors for monitoring the ambient water temperature and the lens fluid temperature. The ambient water temperature signal is transmitted to a programmed electronic lens-fluid temperature prescriber.

A transfer function for determining the lens fluid temperature required to maintain the index of refraction constant for specific ambient water temperatures is programmed into the lens fluid temperature prescriber. When presented with the instantaneous ambient water temperature signal, the prescriber transmits a signal to one input of an error amplifier indicating what the lens fluid temperature should be.

The lens fluid temperature sensor also transmits a signal to a second input of the error amplifier indicating the actual lens fluid temperature. The error amplifier senses the difference in signal levels and transmits an output error signal to a servomechanism system which adjusts a temperature control system which brings the lens fluid temperature to the prescribed lens fluid temperature. The temperature control system comprises cooling means to cool incoming air and heating means to heat another body of incoming air. The two streams are mixed in a chamber in correct proportions to give the desired lens fluid temperature and passed into a heat exchanger through which the lens fluid is circulated and either heated or cooled to the prescribed temperature.

DETAILED DESCRIPTION OF THE PREFERRED EMBODIMENT

Figure 1:
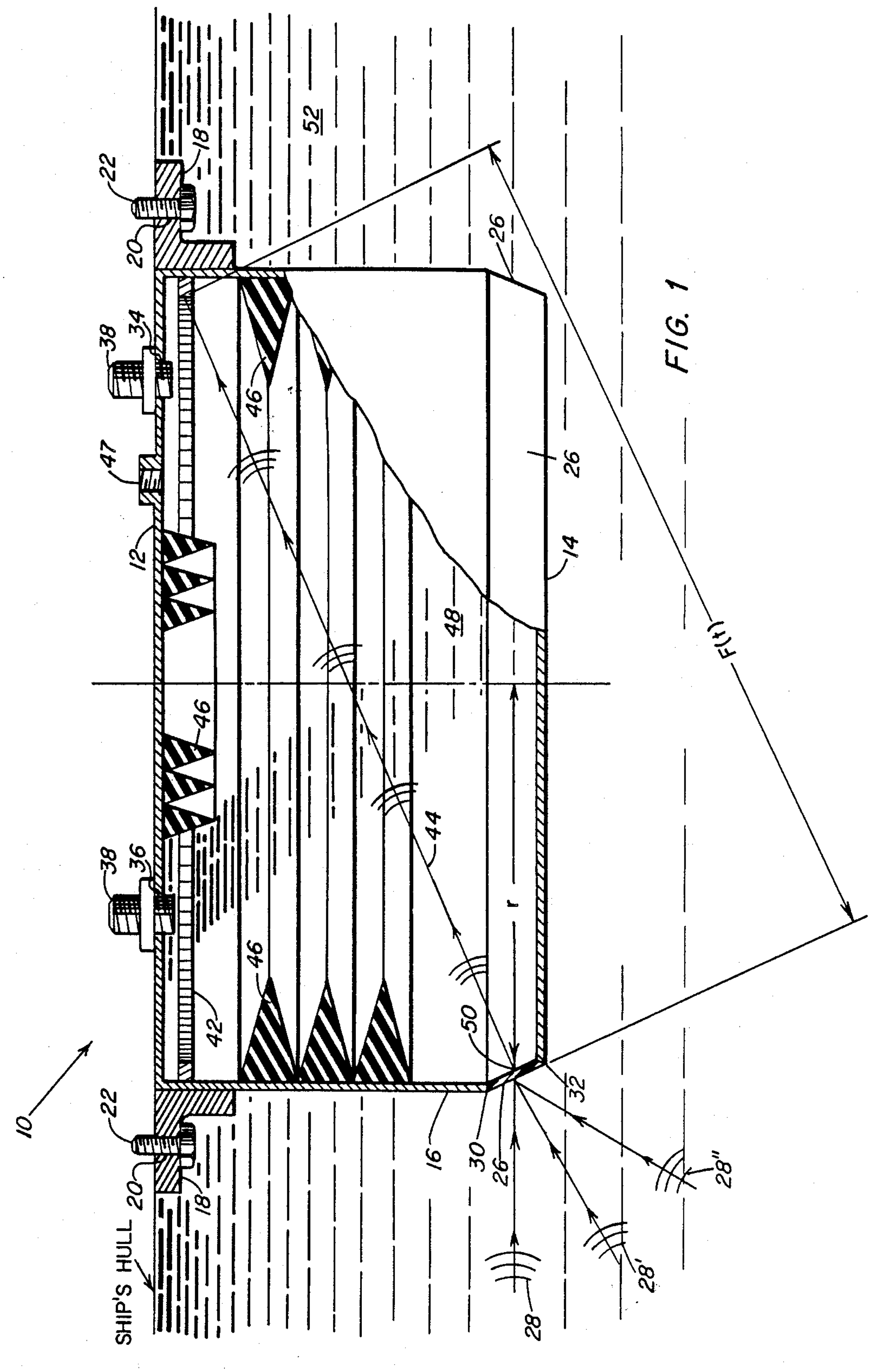
FIG. 1 is a vertical section through a portion of a liquid filled acoustic lens detached from the temperature compensation system showing a refracted sound wave focused on the ring of hydrophones.
Figure 2:
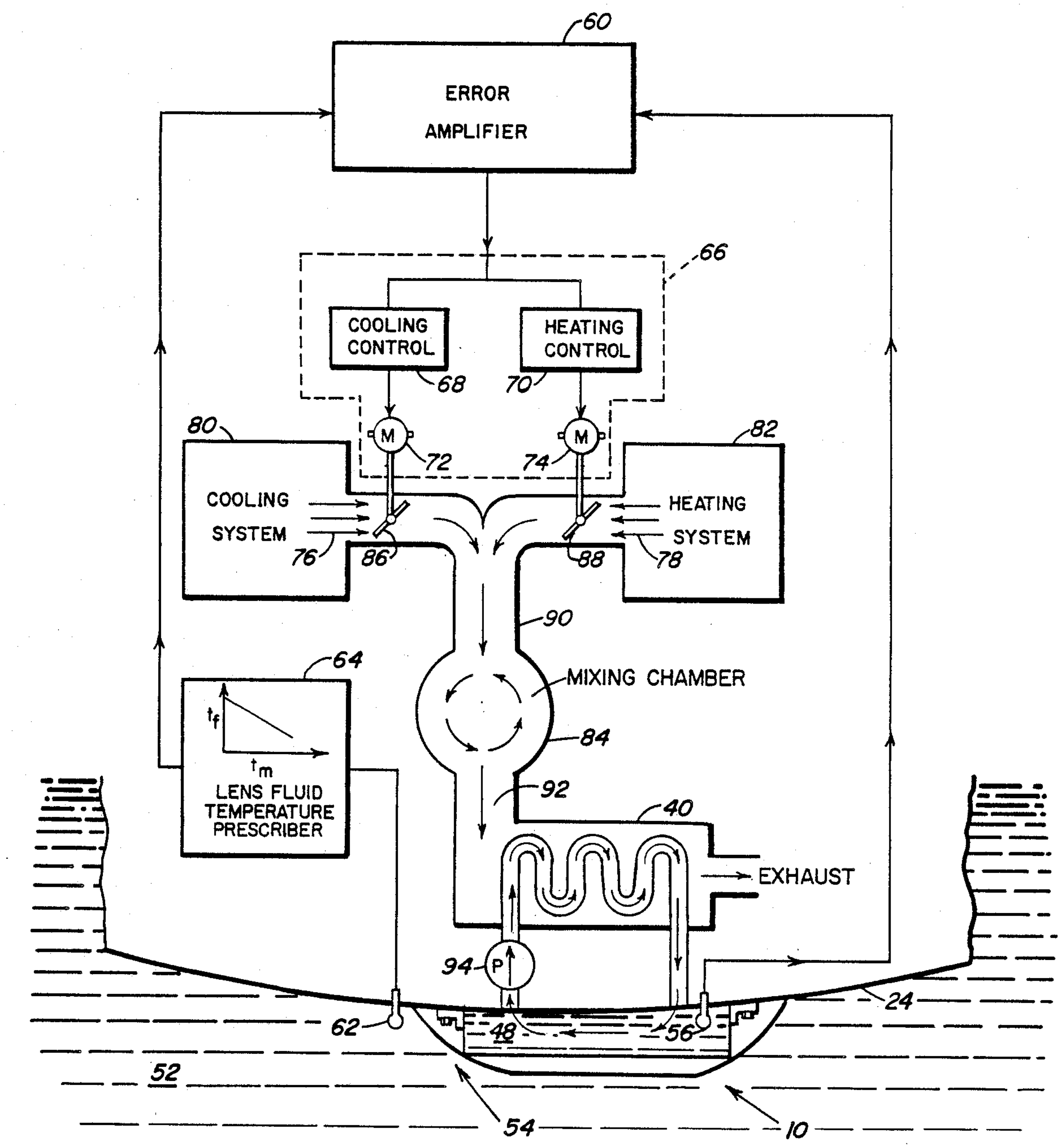
FIG. 2 is a diagramatic representation of a preferred embodiment of the temperature compensation system in use with the lens of FIG. 1.

FIG. 1 shows a cylindrical liquid filled acoustic lens comprising a case 10 having a top plate 12 and a bottom plate 14 secured to a cylindrical wall section 16. Case 10 has suitable fastening means such as a plurality of brackets 18 with holes 20 for accepting bolts 22 and is fastened to the hull of the ship 24 as shown in FIG. 2. Other fastening means will readily come to the mind of one skilled in marine engineering, and the means shown here is only illustrative. A conically shaped acoustic wave transparent window 26 through which sound waves, three of which are shown in FIG. 1 as 28, 28'28", enter into case 10, is fastened to the lower end 30 of side wall 16 and to the periphery 32 of bottom plate 14. Side wall 16 and bottom plate 14, must be good acoustic reflectors, such as steel, to reduce the entry of sound waves into case 10. Sound waves if allowed to enter case 10 by means other than through window 26, would not be focused on the hydrophones 42. Window 26 may be any sound transparent material. It has been found that acrylic butadiene styrene is an excellent material for window 26. Top plate 12 is provided with an inlet hole 34 and an outlet hole 36 with conventional hydraulic fittings 38 to allow a lens fluid 48 to be circulated to and from a heat exchanger 40, (see FIG. 2), wherein it is either heated or cooled to maintain its index of refraction constant, as fully disclosed hereinafter. A ring of commercially available hydrophones 42 for sensing approaching sound waves 28 is located along the interior of wall plate 16. The location of hydrophone ring 42 is such that all of the refracted sound 44 will focus on hydrophones 42. Secured to the interior surface of wall plate 16 below hydrophone ring 42 and to the interior surface of upper plate 12 is a plurality of sound baffles 46 to supress sound reflections within case 10. A hole 47 is provided in top plate 12 for mounting lens fluid temperature sensor 56, see FIG. 2. Case 10 is filled with a lens fluid 48 for refracting and focusing wave 28 on hydrophone ring 42.

The focal length F(t) of the lens is determined according to the relationship $$F(t) = \frac{n_f(t)r}{[n_f(t) - 1]} \qquad \text{[eq. 1]}$$

where F(t) is the mean focal length as measured from the point of entry of sound wave 28 at the center 50 of window 26, $n_f$ is the index of refraction of lens fluid 48 relative to the ambient sea water 52 and r is the mean radius of window 26 as measured from the lens axis to center 50 of lens window 26. The lens disclosed herein was originally designed without constant focal length characteristics to operate in a mean water temperature of 8° C. over an expected temperature range of 0° C. to 30° C. Trichlorotrifluoroethane made by DuPont Corporation under tradename FREON TF was choosen as the lens fluid. This fluid has an index of refraction relative to water at 8° C. of 1.92. Knowing the index of refraction $n_f$ of lens fluid 48, window radius r is chosen such that case 10 will be of a size appropriate for the anticipated installation. The location of hydrophone ring 42 is then determined by calculating the lens focal length F(t) from the above relationship. As will be fully described hereinafter, the temperature compensation system of the invention maintains focal length F(t) constant as ambient water 52 changes in temperature by maintaining index of refraction $n_f$ constant and will be described in relation to maintaining the index of refraction at 1.92. It is to be understood that the invention will maintain other indexes of refraction for other lens fluids over the same or other expected operating temperature ranges.

FIG. 2 shows a preferred embodiment of the invention and is intended as illustrative of a temperature compensation system. FIG. 2 show acoustic case 10 secured to the hull 24 of a ship with appropriate fairing 54 as previously described. A lens fluid temperature sensor 56, such as a thermocouple, for generating a voltage signal proportional to the temperature of lens fluid 48 is submerged in lens fluid 48 and transmits the voltage signal to one input of the error amplifier 60. A similar ambient water temperature sensor 62 is submerged in ambient water 52 outside of the lens case 10 and transmits a voltage signal to the input of the lens fluid temperature prescriber 64 proportional to the magnitude of the ambient water temperature. Lens fluid temperature prescriber 64 is an amplifier electronically programmed to generate an output voltage signal as a function of the ambient water temperature voltage signal input. The output voltage signal from prescriber 64 is transmitted to a second input of error amplifier 60 and represents the temperature that lens fluid 48 must be at so that its index of refraction will remain constant. The means by which the prescribed lens fluid temperature as a function of ambient water temperature is obtained for programming into prescriber 64 will be described hereinafter. The remaining components of the system bring lens fluid 48 to the prescribed temperature.

An output error voltage signal proportional to the difference between the two input voltages from lens fluid temperature sensor 56 and prescriber 64 as sensed by error amplifier 60 is transmitted to a servomechanism 66 (illustrated in phantom outline) including well known electrical controls 68, 70 which generate electrical signals for operating cooling and heating servomotors 72, 74. Servomotors 72, 74 respond according to the demand for heat or cooling of fluid 48 as determined by the difference between the relative magnitudes of the temperature input signals to error amplifier 60. In the embodiment shown in FIG. 2, cool air and heated air vent valves 86, 88 are mounted between the cooling system 80 and heating system 82 and manifold 90. Vent valves 86, 88 are operated by servomotors 72, 74 and control the proportion of cooled air 76 and heated air 78 that enter the manifold 90. A mixing chamber 84 is mounted to manifold 90 and assures a uniform conditioned air stream 92. Mixing chamber 84 is also mounted to heat exchanger 40, through which lens fluid 48 is circulated by the pump 94. Air stream 92 passes into heat exchanger 40 where the temperature of lens fluid 48 is either raised or lower by conventional heat transfer principles. Cooling system 80 and heating system 82 may comprise conventional coils to provide cooling and heat. Heat may be extracted from the numerous on board ship heat generating apparatus such as engine exhaust heat. Other heating and cooling means will readily come to the mind of those familiar with such systems.

THEORY OF OPERATION

Figure 3:
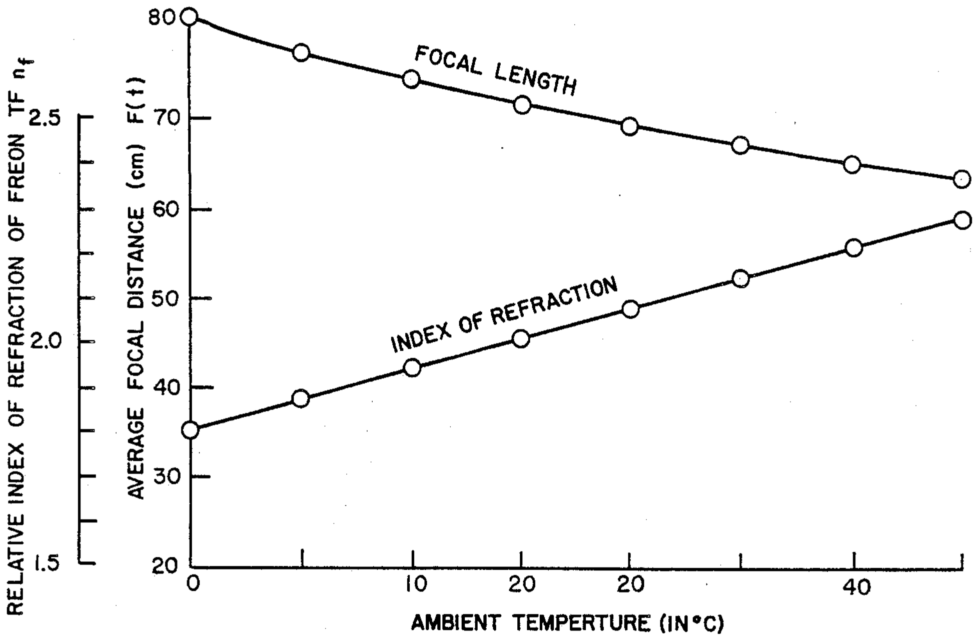
FIG. 3 is a graphical representation of the change in the index of fraction of a lens fluid and focal length of the lens with temperature.

The problem as initially set forth in the background discussion may be more fully understood from the following considerations. The equation for the focal length F(t) of the lens of case 10 as a function of the index of refraction $n_f(t)$ of lens fluid 48 is given by equation 1 above. The only temperature dependant parameter on the right side of equation 1 is index of refraction $n_f(t)$ of fluid 48. Merely maintaining the temperature of lens fluid 48 constant will not hold focal length Ft constant because of the implicit dependence of index of refraction $n_f(t)$ on the temperature dependent sound velocity in the surrounding water 52. At any given equilibrium temperature of lens fluid 48 and ambient water 52, the index of refraction of lens fluid 48 relative to the surrounding water 52 is given by $$n_f = v_m / v_f \qquad \text{[eq. 2]}$$

where $v_m$ and $v_f$ are the sound velocities in ambient water 52 and lens fluid 48 respectively. In water, the sound velocity is given by $$v_m = 1449 + 4.6t_m - 0.055t_m^2 + 0.0003t_m^3 + [1.39 - 0.012t_m]][S-35] + 0.017d \qquad \text{[eq. 3]}$$

where $t_m$ is the ambient water temperature in °C., S is its salinity in parts per thousand, and d is the depth in meters. It has been found that the effect of salinity S and depth d have a negligible effect on the velocity of sound $v_m$ in relation to the effect that the temperature $t_m$ has, therefore the salinity and depth factors can be neglected in determining the function to be programmed into lens fluid temperature prescriber 64 without appreciable error. The sound velocity in FREON TF is given as a function of temperature by $$v_f = 712.5 - 3.13(20 - t_f) \qquad \text{[eq. 4]}$$

where constants 712.5 and −3.13 are, respectively, the sound velocity in meters per second in Freon TF at 20° C., and the negative temperature coefficient of Freon TF. Tf is the temperature of the lens fluid. The velocity of sound as a function of temperature for other lens fluids would be substituted for eq. 4 given here when used in place of Freon TF. From the foregoing, the functional dependence of index of refraction $n_f$ may be calculated from eq. 2. This result is plotted in FIG. 3. Using values of index of refraction nf from eq. 2 in eq. 1 to calculate F(t) shows how the lens focal length F(t) varies with temperature. This result is also plotted in FIG. 3 and illustrates the problem to be solved. As shown in FIG. 3, the focal length of the lens disclosed herein changes from 80.9 cm to 67.3 cm over the operating temperature range. This represents a 13.6 cm change that must be compensated for to make the lens practical.

The steps to be performed by lens fluid temperature prescriber 64 in calculating the prescribed lens fluid temperature as a function of ambient water temperature and to be programmed into lens fluid temperature prescriber 64 is obtained from the above relationships as described hereinafter.

First the velocity of sound in the ambient water is calculated for each temperature over the expected operating range from equation 3.

Secondly, the velocity of sound, in the lens fluid being used, required to maintain a given index of refraction is calculated for each ambient water temperature condition by substituting the sound velocities in the water medium at each temperature calculated from equation 3, and the desired value of the index of refraction to be maintained, into equation 2, and solving for the sound velocity in the lens fluid.

Figure 4:
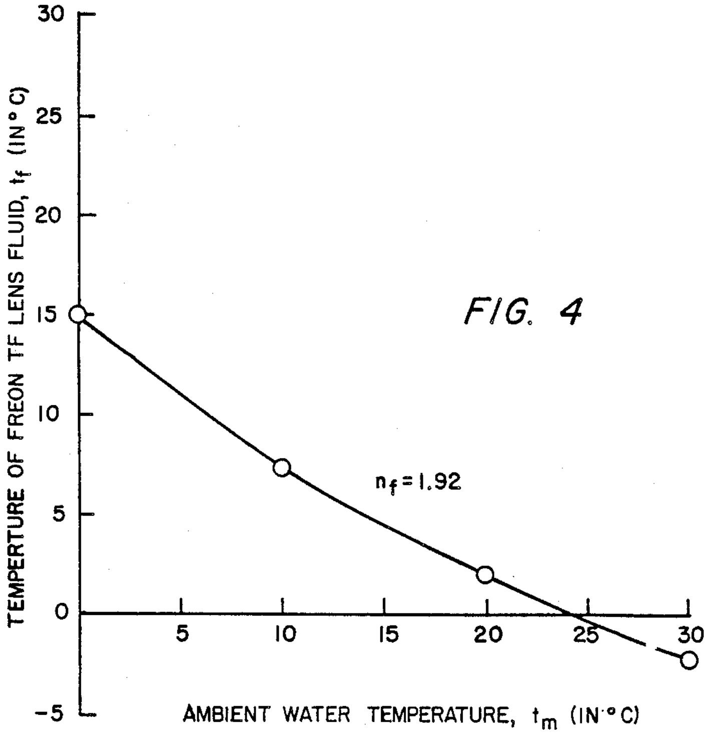
FIG. 4 is a graphical representation of the lens fluid temperature as a function of ambient water temperature required to maintain a constant index of refraction.

Thirdly, the prescribed lens fluid temperature over the ambient water temperature range is calculated by substituting the sound velocities in the lens fluid, calculated from equation 2 into equation 4, and solving for the lens fluid temperature. The above calculations for determining the prescribed lens fluid temperature as a function of ambient water temperature for the embodiment shown using FREON TF lens fluid are performed by prescriber 64 according to the transfer function $$t_f = \frac{[1449 + 4.6\,t_m - .055t_m^2 + .0003t_m^3]}{3.13n_f} - 207.6 \qquad \text{[eq. 5]}$$

derived through mathematical substitution between the above equations and graphically shown in FIG. 4. The denominator of eq 5 is further reduced to a value that depends on the specific index of refraction nf to be maintained. For the embodiment shown herein, the index of refraction to be maintained is 1.92 and the denominator reduces to the value 6.0. For other lens fluids the transfer function is obtained through the same mathematical substitution process as above except the equation for the velocity of sound as a function of temperature for the chosen lens fluid is used in place of the equation for the velocity of sound in FREON TF of this example. Equations for the velocity of sound as a function of temperature in fluids typically used in acoustic lenses are available in the literature.

Other modifications and embodiments will come to the mind of one skilled in liquid filled acoustic lenses and said modifications and embodiments are to be included within the scope of the appended claims.

What is claimed is:

1. In an acoustic lens for detecting sound waves eminating from an underwater target located in an ambient body of water, including a case, an acoustic wave transparent window mounted on said case for allowing sound waves to enter the case, the case being filled with a lens fluid having an acoustic index of refraction relative to said ambient water for refracting the sound waves onto hydrophone means mounted within the case at a predetermined location for detecting the sound waves, wherein the improvement comprises:

means for changing the temperature of said lens fluid in relation to the temperature of the ambient water according to a predetermined relationship so that the index of refraction of the lens fluid relative to the ambient water remains constant, whereby the sound waves are continually focused on said hydrophone means as the temperature of the ambient water changes.

2. In an acoustic lens for detecting sound waves eminating from an underwater target located in an ambient body of water, including a case, an acoustic wave transparent window mounted on said case for allowing sound waves to enter the case, the case being filled with a lens fluid having an acoustic index of refraction relative to said ambient water for refracting the sound waves onto hydromeans phone mounted within the case at a predetermined location for detecting the sound waves, wherein the improvement comprises:

an ambient water temperature sensor for generating a signal proportional to the temperature of the ambient water, a lens fluid temperature sensor for generating a signal proportional to the actual temperature of the lens fluid, means connected to said ambient water temperature sensor for prescribing the temperature of the lens fluid required to maintain the lens fluid index of refraction relative to the ambient water constant as the ambient water temperature changes, means connected to said means for prescribing the temperature of the lens fluid and to said lens fluid temperature sensor for sensing the difference between the actual lens fluid temperature and the prescribed lens fluid temperature and for generating an output error signal, means for controlling the actual temperature of the lens fluid to the temperature prescribed by the means for prescribing, servomechanism means electrically connected to the output error signal from said means for sensing for adjusting said means for controlling the temperature of the lens fluid in response to the error output signal so that the actual lens fluid temperature is brought to that prescribed by the lens fluid temperature prescriber, whereby the sound waves are continually focused on said hydrophones as the temperature of the ambient water changes.

3. The improvement as defined in claim 2 wherein said means for prescribing the lens fluid temperature required to maintain the lens fluid index of refraction constant comprises:

an amplifier having an input connected to the ambient water temperature signal generated by the ambient water temperature sensor adapted to generate an output signal as a predetermined function of said ambient water temperature signal, whereby the output signal represents said prescribed lens fluid temperature.

4. The improvement as defined in claim 2 wherein said means for sensing the difference between the actual and prescribed lens fluid temperatures and for generating the output error signal comprises:

an error amplifier having one input connected to the actual lens fluid temperature signal generated by the lens fluid temperature sensor, and a second input connected to said output signal generated by the means for prescribing, said error amplifier adapted to generate an output error signal proportional to the difference between the input signal levels.

5. The improvement as defined in claim 2 wherein said means for controlling the actual temperature of the lens fluid to the prescribed lens fluid temperature comprises:

means for heating a body of air, means for cooling a second body of air, means mounted in flow regulating relation to said heating and cooling means for controlling the proportion of heated air and cooled air to be mixed together in response to said servomechanism means, means in air flow communication with said heating and cooling means for mixing the bodies of air so that the resulting air mixture is of a uniform temperature, means in air flow communication with said means for mixing for transferring heat between the mixed body of air and the lens fluid, means for circulating the lens fluid through said means for transferring heat and the lens case, whereby the temperature of the lens fluid is uniformly brought to the lens fluid prescribed temperature.

6. The improvement as defined in claim 2 wherein said servomechanism means for adjusting the means for controlling the lens fluid temperature comprises;

electrical control means for generating electrical control signals in response to the magnitude of the output error signal generated by the means for sensing, a plurality of servomotors electrically connected to the electrical control signals generated by said electrical control means for adjusting the means for controlling the temperature of the lens fluid in response to said electrical control signals.

7. The improvement as defined in claim 1 wherein the lens fluid is trichlorotrifluroethane.

8. The improvement as defined in claim 2 wherein the lens fluid is trichlorotrifluroethane.

9. The improvement as defined in claim 3 wherein the lens fluid is trichlorotrifuloethane.

10. The improvement as defined in claim 9 wherein the predetermined function for generating the output signal from said lens fluid temperature prescriber is $$t_f = \frac{[1449 + 4.6\,t_m - .055t_m^2 + .0003t_m^3]}{3.13\,n_f} - 207.6$$

where $t_f$ is the prescribed lens fluid temperature as represented by the output signal from the lens fluid temperature prescriber, $t_m$ is the temperature of the ambient water as represented by the signal from the ambient water temperature sensor, and nf is the index of refraction of trichlorotrifluoroethane to be maintained constant.

* * * * *